UNITED STATES PATENT OFFICE 2,604,454

DETERGENT COMPOSITION CONTAINING DIIMIDAZOLES

Franz Ackermann, Binningen, and Jules Meyer, Basel, Switzerland, assignors to Ciba Limited, a Swiss firm No Drawing. Application March 12, 1948, Serial No. 14,627. In Switzerland March 19, 1947

11 Claims. (Cl. 252—117)

According to this invention materials, especially fibrous materials, are improved by treating them at any desired stage in a process for improving the materials with a preparation containing an emulsifying agent (including saponaceous detergents) and also at least one asymmetric substitution product of a diimidazole of the general formula

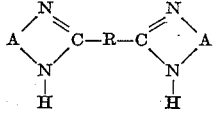

wherein A is an aromatic radical in which two vicinal carbon atoms are bound to nitrogen atoms of the imidazole rings and R is a bivalent aliphatic radical containing at least one double bond, all double bonds of the imidazole nuclei and of the radical R forming an uninterrupted series of conjugated double bonds.

The compounds of the above formula do not possess the character of dyestuffs, but have a more or less pronounced affinity towards a very wide variety of substrata. Owing to these properties the products of this invention applied to the material by treatment with the indicated compositions of matter, and producing a blue to violet fluorescence in daylight or ultra-violet light, improve the whiteness of undyed materials and the purity of color of dyed materials. In the case of undyed, originally yellowish materials the improvement in whiteness becomes apparent by the fact that the applied compound producing a blue to violet fluorescence imparts a white appearance to the originally yellowish material. If the compositions of matter of the present invention contain also cleansing agents (of which suitable representatives are indicated below) in addition to the cited diimidazoles, the treatment with such compositions of matter produces simultaneously a cleansing effect. It is thus possible to obtain a brightening effect of high quality on undyed materials especially cellulose materials without impairing the fiber.

Examples of asymmetric substitution products of diimidazoles of the cited general formula

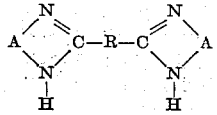

wherein A and R have the meanings given above, are those substitution products in which a substituent, for instance an alkyl radical, an alkoxy group or a halogen atom, is contained in only one of the two radicals A. The following compounds may be used: α-[6-chlorobenzimidazyl-(2)]-β-[benzimidazyl-(2)]-ethylene, α-[6-methyl-benzimidazyl-(2)]-β-[benzimidazyl-(2)]-ethylene, or α-[6-methoxy-benzimidazyl-(2)]-β-[benzimidazyl-(2)]-ethylene.

Especially advantageous, however, are compositions of matter containing at least one diimidazole of the general formula

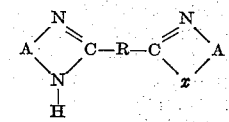

Products of the general formulae

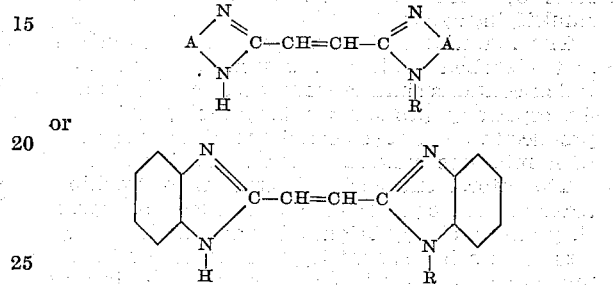

wherein A is for instance a radical of the benzene or naphthalene series and R stands for an alkyl radical (including substituted alkyl radicals such as hydroxy alkyl radicals), an aryl radical or an aralkyl radical, are examples of diimidazoles of the cited formula

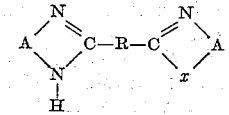

Among these diimidazoles the following may be cited: α-[benzimidazyl-(2)]-β-[N-methyl-benzimidazyl-(2)]-ethylene, α-[N-hydroxyethyl-benzimidazyl-(2)]-β-[benzimidazyl-(2)]-ethylene, α-[benzimidazyl-(2)]-β-[N-ethyl-benzimidazyl-(2)]-ethylene, α-[benzimidazyl-(2)]-β-[N-benzyl-benzimidazyl-(2)]-ethylene.

Asymmetrically substituted diimidazoles containing a substituent in only one of the aryl radicals may be obtained according to the processes described in U. S. Patent No. 2,488,289, issued November 15, 1949. The manufacture of asymmetrically substituted diimidazoles containing a substituent on a nitrogen atom of only one imidazole ring is disclosed and claimed in U. S. Patent No. 2,515,173, issued July 18, 1950.

The process for improving materials in accordance with the invention may be carried out by impregnating the material to be improved with a solution, for example, an aqueous solution, or a dispersion of one of the compositions of matter hereinbefore described, and, after centrifuging or squeezing the material, drying it. Asymmetrically substituted diimidazoles containing an imino group in at least one imidazole ring are soluble in alcohols after conversion into alkali metal salts.

As emulsifying agents the compositions of matter of this invention may contain, for example, sulfite cellulose waste liquor or condensation products of naphthalene sulfonic acids which may be alkylated with formaldehyde; they may also contain saponaceous cleansing agents which, as is known, are also good emulsifying agents. As examples of such saponaceous cleansing agents there are named ordinary soaps, salts of sulfonated washing agents, for example, of sulfonated benzimidazoles substituted at the 2-carbon atom by higher alkyl radicals, further monocarboxylic acid esters of 4-sulfophthalic acid having higher fatty alcohols, and also salts of sulfonated fatty alcohols or condensation products of higher fatty acids with aliphatic hydroxy- or aminosulfonic acids. Such sulfonated washing agents are representatives of the group of synthetic anion-active cleansing agents. The indicated sulfonated washing agents contain either the sulfonic acid group —SO₃H or the sulfuric acid ester group —OSO₃H, they contain therefore radicals of sulfuric acid. In the compositions of matter of this invention also a polyglycol ether of a fatty alcohol may be present as an emulsifying agent.

The material to be improved can be washed and bleached with a composition of matter which contains simultaneously a cleansing agent. An especially pronounced brightening effect is produced when undyed cellulose fibers are treated with mixtures containing such washing agents.

The aforementioned mixtures with washing agents as a rule present the following advantages: they have a strong brightening action; they may also be of a low sensitivity to moisture and thus undergo no change in color during long storage periods, thus contrasting favorably with the known N:N′-disubstituted diimidazoles; moreover, they may be better suitable for the treatment of material containing lime soap, since they may cause practically no coloring of the lime soap stains existing in such material, whereas N:N′-disubstituted diimidazoles of comparable constitution tend to cause a yellowish coloration of these stains. A particularly pronounced brightening is obtained when unbleached cellulosic material is treated with such mixtures containing washing agents.

The compositions of matter used in the process of the invention may also be applied in the course of the manufacture of the material to be improved. In this case the compound may be added, for example, to a paper mass or a viscose solution which is to be used for making films or filaments.

The compositions of matter of the invention may also be added, for example, to liquors used for imparting a crease resistant finish. They are also suitable for the after-treatment of discharge prints.

As materials which can be improved with the compositions of matter described above, there may be mentioned, for example, the following:

Cellulosic materials, such as cellulose pulp, paper, also textile materials from cotton, linen, regenerated cellulose, including staple fibers of regenerated cellulose; furthermore, natural and artificial nitrogenous material, such as wool, silk, or synthetic polyamide fibers; finally, synthetic materials, e. g. materials obtained by polymerization. The material to be treated may be in any form, e. g. the form of fibers or felt, and it may be, for example, undyed, dyed, or printed.

Small amounts of the asymmetrically substituted diimidazoles, in general less than 1 per cent., for instance 0.005–0.5 per cent., are sufficient to increase markedly the efficiency of detergents such as soaps.

In the following illustrative examples of the mode of preparing the new compounds according to the invention, the "parts" are "parts by weight" unless otherwise stated, and the "parts by weight" bear the same relation to "parts by volume" as do grams to cubic centimeters:

*Example 1*

100 parts of a fused soap mass containing, for example, 60 per cent of fatty acid are stirred with 0.005–0.5 part of α-[benzimidazyl-(2)]-β-[N-hydroxyethyl-benzimidazyl-(2)]-ethylene of the formula

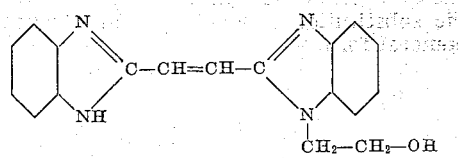

The mass is allowed to solidify to yield a soap-like preparation. Cellulosic material which has been washed with this preparation possesses a whiter appearance than if the material had been washed with the soap alone.

In order to facilitate its dispersion the imidazole derivative may first be dissolved in a small quantity of alcoholic caustic soda solution or in alcohol alone or in another solvent which is miscible with water, and added to the soap in the form of such a solution. Alternatively, the imidazole derivative may first be mixed with a liquid or fused free fatty acid, and then converted into a soap-like preparation in the usual manner by neutralizing the fatty acid.

The diimidazole mentioned above may be obtained in the following manner:

24 parts of ethylene chlorhydrin are added in the course of about 2 hours to a boiling solution of 72 parts of the acid sulfate of α:β-di-[benzimidazyl-(2)]-ethylene in 600 parts of ethyl alcohol and 160 parts of caustic soda solution of 30 per cent strength. The whole is heated at the boil for a further 2 hours under reflux, and then allowed to cool. A small quantity of α:β-di-[N-hydroxyethyl-benzimidazyl-(2)]-ethylene which precipitates is separated by filtration, the filtrate is poured into water, and the precipitated α - [benzimidazyl - (2)] - β - [N - hydroxyethyl-benzimidazyl-(2)]-ethylene is separated by filtration and washed with water. It can be obtained in the pure state by way of its hydrochloride. The new base so obtained is a pale yellow powder which when dissolved in alcohol exhibits a violet-blue fluorescence.

Instead of the above diimidazole there may be used α - [benzimidazyl-(2)]-β-[6-methyl-benzimidazyl-(2)]-ethylene, or the diimidazole of the formula

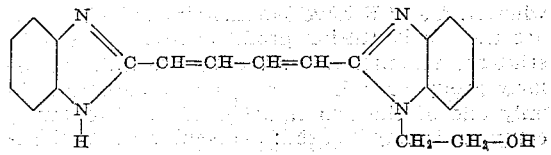

or an asymmetrically substituted dinaphthimidazole, for example, one with a hydroxy alkyl group linked to an imidazole-N-atoms, or a diimidazole of the benzene or napthalene series with an N-hydroxy-propyl group linked to an imidazole ring. In similar manner soap may be replaced by another emulsifying agent, such as a condensation product of naphthalene sulfonic acid and formaldehyde.

It is also possible to raise the quantity of the diimidazole to, for example, 0.7 per cent.

*Example 2*

The procedure is the same as that described in Example 1, except that, instead of α-[benzimidazyl-(2)]-β-[N-hydroxyethyl-benzimidazyl-(2)]-ethylene, there is used α-[benzimidazyl-(2)]-β-[N-(dimethylaminoethyl)-benzimidazyl-(2)]ethylene of the formula

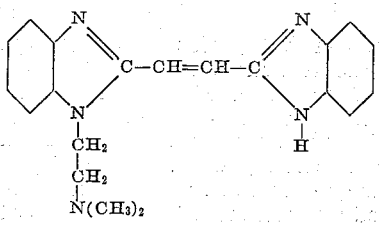

By using α-[benzimidazyl-(2)]-β-[N-(diethylaminoethyl)-benzimidazyl-(2)]-ethylene, which can be obtained from diethyl-β-chlorethylamine hydrochloride instead of α-[benzimidazyl-(2)]-β-[N-(dimethylaminoethyl)-benzimidazyl-(2)]-ethylene, there is obtained a soap preparation having similar properties.

The diimidazole mentioned in the first paragraphs may be obtained in the following manner:

A solution of 44 parts of dimethyl-β-chlorethylamine hydrochloride in 300 parts of ethyl alcohol is added dropwise in the course of 2–3 hours to a boiling solution of 52 parts of α:β-di-[benzimidazyl-(2)]-ethylene in 350 parts of ethyl alcohol and 110 parts of caustic soda solution of 30 per cent. strength. The whole is maintained at the boil for about 2 hours longer, filtered to remove small quantities of by-products, water is added to the hot solution until a slight turbidity occurs, and the whole is allowed to cool.

The condensation product which precipitates is separated by filtration and washed with dilute aqueous alcohol. It may be purified by way of its hydrochloride.

The resulting α-[benzimidazyl-(2)]-β-[N-(dimethylaminoethyl) - benzimidazyl - (2)]-ethylene of the formula

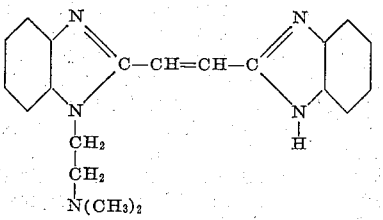

is a bright powder which when dissolved in alcohol exhibits a violet-blue fluorescence.

*Example 3*

0.005–0.5 part of α-[benzimidazyl-(2)]-β-[N-methylbenzimidazyl-(2)]-ethylene is added at 70–80° C. to a solution of 100 parts of soap in 200 parts of water.

As soon as a homogeneous solution has been obtained it is allowed to cool. There is obtained a soap-like preparation. Textile goods which have been washed with this preparation possess a whiter appearance than material which has been washed with soap alone. The proportion of the optical bleaching agent used above may be decreased or increased.

The diimidazole mentioned above may be obtained in the following manner:

A solution of 104 parts of α:β-di-[benzimidazyl-(2)]-ethylene in 500 parts of ethyl alcohol and 221 parts of caustic soda solution of 30 per cent. strength is stirred with 30–40 parts of methyl chloride for about 6 hours in a pressure vessel at 80–90° C.

After cooling, a small quantity of α:β-di-[N-methylbenzimidazyl-(2)]-ethylene which separates is removed by filtration, the filtrate is poured into water, and the precipitate is separated by filtration and washed with water. In order to remove residual starting material the product is heated with acetic acid of 25 per cent. strength, filtered, the filtrate is mixed with ammonia and the precipitated α-[benzimidazyl-(2)]-β-[N-methyl-benzimidazyl-(2)] ethylene is separated by filtration and washed with water. It may be obtained in the pure state by way of its hydrochloride.

The new base is a pale yellow crystalline powder which when dissolved in alcohol or acetone exhibits a violet-blue fluorescence.

*Example 4*

The procedure is the same as that described in Example 1, except that 0.2 part of α-[benzimidazyl-(2)]-β-[N-benzyl-benzimidazyl-(2)]-ethylene is used instead of α-[benzimidazyl-(2)]-β-[N-hydroxyethyl-benzimidazyl-(2)]-ethylene.

The diimidazole mentioned above may be obtained in the following manner:

32 parts of benzyl chloride are gradually added to a boiling solution of 52 parts of α:β-di-[benzimidazyl-(2)]-ethylene in 320 parts of ethyl alcohol and 120 parts of caustic soda solution of 30 per cent. strength. The whole is stirred for a further 2 hours at the boiling point and then allowed to cool. A small quantity of α:β-di-[N-benzyl-benzimidazyl-(2)]-ethylene which precipitates is separated by filtration, the filtrate is poured into water, and the precipitated α-[benzimidazyl - (2)] - β - [N - benzyl-benzimidazyl-(2)] - ethylene is separated by filtration, washed with water and dried. It is obtained in the pure state by recrystallisation from alcohol. It is a pale yellow powder which exhibits a violet-blue fluorescence in alcoholic solution.

*Example 5*

The sodium salt of 2-heptadecyl-N-benzyl-benzimidazyl-disulfonic acid is mixed with 0.01–0.5 per cent. of finely pulverized α-[benzimidazyl - (2)] - β-[N-hydroxyethylbenzimidazyl-(2)]-ethylene. Textile goods which have been washed in the usual manner with this mixture possess a higher whiteness than goods which have been treated with the aforesaid sodium salt alone.

Instead of the above mentioned sodium salt there may be used an alkali salt of a sulfonic acid of another benzimidazole which contains a higher alkyl residue, or mixtures of such alkali salts of sulfonated benzimidazoles containing alkyl residues having different chain lengths. There may also be used other α:β-di-[benzimidazyl-(2)]-ethylenes which contain at least one substituent at the nitrogen atoms. There also come into consideration mixtures with other synthetic washing agents, for example, fatty alcohol sulfonates or condensation products of higher fatty acids with aliphatic hydroxy- or amino-sulfonic acids. The synthetic washing agents may also be added to mixtures of the foregoing benzimidazyl-ethylenes.

As synthetic washing agents there may also be used polyglycollic ethers of higher fatty alcohols, furthermore amino carboxylic acids which are acylated with higher fatty acids. In lieu of the above N-hydroxy-alkyl substitution products one may use the corresponding N-methyl- or N-ethyl derivatives. As examples of suitable fatty alcohol sulfonates there may be mentioned those which are derived from lauryl alcohol, myristic alcohol, cetyl alcohol or olein alcohol.

Example 6

The procedure is the same as that described in Example 1 except that 0.01–0.3 part of α-[benzimidazyl-(2)]-β-[N-ethyl-benzimidazyl-(2)]-ethylene is used instead of α-[benzimidazyl-(2)]-β-[N-hydroxyethyl-benzimidazyl-(2)]-ethylene.

It is also possible to raise the quantity of the diimidazole to, for example, 0.7 per cent.

The diimidazole mentioned above may be obtained in the following manner:

26 parts of α:β-di-[benzimidazyl-(2)]-ethylene are added to a solution of 7 parts of sodium in 600 parts of absolute alcohol. The whole is heated at the boil under reflux, and 17.4 parts of diethyl sulfate are added to the boiling solution in the course of 2 hours. The whole is stirred for a short time at the boiling point and then allowed to cool. A small quantity of α:β-di-[N-ethyl-benzimidazyl-(2)]-ethylene which precipitates is separated by filtration. The filtrate is poured into water, the precipitated α-[benzimidazyl-(2)]-β-[N-ethyl-benzimidazyl-(2)]-ethylene is separated, washed neutral with water and dried. It can be obtained in the pure state by way of its hydrochloride or by recrystallisation from an alcoholic solution of sodium hydroxide. It is then obtained in the form of a pale yellow powder which exhibits a blue-violet fluorescence in alcoholic solution.

Example 7

The sodium salt of sulfonated μ-heptadecyl-benzimidazole is mixed with 0.01–0.5 per cent of finely pulverized α-[benzimidazyl-(2)]-β-[N-methylbenzimidazyl-(2)]-ethylene. Undyed textile goods which have been washed in the usual manner with this mixture possess a higher whiteness than the same material which has been treated only with the aforesaid sodium salt.

Example 8

The procedure is the same as that described in Example 1 except that 0.01–0.3 part of the diimidazole of the formula

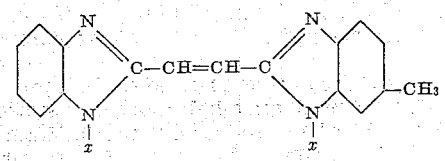

in which one $x$ represents hydrogen and the other $x$ the radical $OH-CH_2-CH_2-$, is used instead of α-[benzimidazyl-(2)]-β-[N-hydroxyethyl-benzimidazyl-(2)]-ethylene.

The diimidazole mentioned above may be obtained in the following manner:

2.7 parts of α-[benzimidazyl-(2)]-β-[6-methyl-benzimidazyl-(2)]-ethylene are added to a boiling solution of 0.7 part of sodium in 50 parts of alcohol. As soon as dissolution has occurred, there is added in the course of 1 hour a mixture of 1.4 parts of ethylene chlorhydrin and 5 parts of alcohol.

The whole is maintained at a gentle boil for a further hour, and poured into water. The precipitated diimidazole of the formula

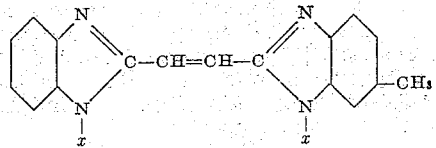

in which one $x$ represents hydrogen and the other $x$ the residue $OH-CH_2-CH_2-$ is separated by filtration, washed neutral with water and dried. It may be purified by way of its hydrochloride or by recrystallization from alcohol. It is a pale yellow powder. In alkaline solution it exhibits a violet-blue fluorescence. The above-mentioned starting material may be obtained in the following manner:

19 parts of β-[benzimidazyl-(2)]-propionic acid and 12.2 parts of 1-methyl-3:4-diamino-benzene are boiled with 150 parts of hydrochloric acid of 15 per cent strength under reflux for 24 hours, and then allowed to cool. The crystals which precipitate are separated by filtration, if necessary, the remainder of the diimidazole is separated from the filtrate by the addition of sodium chloride or concentrated hydrochloric acid, and washed with sodium chloride solution. The resulting hydrochloride of α-[benzimidazyl-(2)]-β-[6-methyl-benzimidazyl-(2)]-ethane may be purified by recrystallization from dilute hydrochloric acid. The free base can be obtained in the form of a colorless powder, which is insoluble in water, by precipitation from a hydrochloric acid solution with ammonia.

5.6 parts of the resulting α-[benzimidazyl-(2)]-β-[6-methylbenzimidazyl-(2)]-ethane are dissolved hot in 30 parts of glacial acetic acid, and heated at the gentle boil in a reflux apparatus for 3 hours with a solution of 13.6 parts of mercuric acetate in 60 parts of glacial acetic acid. After a few minutes there forms in the originally clear reaction solution a thick yellow colored magma which in time becomes thinner. After the heating operation the glacial acetic acid is removed by distillation under reduced pressure. The dry residue is boiled with 180 parts of alcohol and 30 parts of caustic soda solution of 10 per cent strength for a few hours in a reflux apparatus. The reaction mixture is then filtered hot through a folded filter. The clear filtrate is freed from alcohol by distillation. The residue is then acidified with hydrochloric acid, and concentrated ammonia solution is added until the reaction is strongly alkaline. The precipitated dehydrogenation product is separated by filtering with suction, washed neutral with water and dried.

The resulting α-[benzimidazyl-(2)]-β-[6-methyl-benzimidazyl-(2)]-ethylene is a pale yellow powder which dissolves in alcohol to give solutions which exhibit a strong pale blue fluorescence.

Example 9

The sodium salt of the acid sulfuric acid ester of a fatty alcohol mixture as is obtained by reducing cocoanut oil is mixed with 0.005 to 0.5 per cent of finely pulverized α-[benzimidazyl-(2)]-β-[N-hydroxyethyl-benzimidazyl-(2)]-ethylene. Undyed textile material which has been washed in the usual manner with the above mixture presents a whiter appearance than a piece of the same material which has been treated with the above mentioned sodium salt without any addition.

Example 10

A mixture is made of 0.05 per cent. finely pulverized α-[6-methyl-benzimidazyl-(2)]-β-[N-ethyl-benzimidazyl-(2)]-ethylene and soap. Cellulose material washed with this preparation presents a whiter appearance than a piece of the same material washed with soap alone.

The above diimidazole can be produced as follows:

77 parts of diethyl sulfate and also caustic soda solution of 30 per cent strength are added in the course of 1 hour at 70–80° C. to a solution of 38 parts of β-[benzimidazyl-(2)]-propionic acid in 300 parts of alcohol and 50 parts of caustic soda solution of 30 per cent. strength, care being taken that the reaction mixture has an alkaline reaction throughout. The whole is maintained for a further hour at the same temperature, 400 parts of water are added, the whole is stirred for 1 hour at 80° C., sodium chloride or another salting out agent is added, and the whole is allowed to cool. The precipitated sodium salt of β-[N-ethylbenzimidazyl-(2)]-propionic acid is separated by filtration, washed with sodium chloride solution and dried. It is a colorless powder which dissolves easily in water.

22 parts of sodium β-[N-ethyl-benzimidazyl-(2)]-propionate and 12 parts of 1-methyl-3:4-diaminobenzene are boiled with 200 parts of hydrochloric acid of 15 per cent strength for 10 hours under reflux, and then allowed to cool. The precipitated hydrochloride of α-[N-ethylbenzimidazyl-(2)]-β-[6-methyl-benzimidazyl-(2)]-ethane is separated by filtration and washed with hydrochloric acid of 15 per cent. strength. In order to prepare the base the hydrochloride is dissolved hot in dilute hydrochloric acid and the base is precipitated with ammonia. The base is separated by filtration, washed neutral with water, and dried. It is a colorless powder which is insoluble in water.

6 parts of the resulting α-[N-ethylbenzimidazyl-(2)]-β-[6-methyl-benzimidazyl-(2)]-ethane are dissolved in 30 parts of hot glacial acetic acid, and the solution is heated with a solution of 13.6 parts of mercuric acetate in 60 parts of glacial acetic acid for 1½ hours at the gentle boil. After a short time a yellow magma precipitates which again passes into solution and metallic mercury settles to the bottom. After being heated the solution is poured off and the glacial acetic acid is distilled under reduced pressure. The dry residue is digested with hydrochloric acid and then concentrated ammonia solution is added in excess. The precipitated base is separated by filtering with suction, washed neutral with water and then dried. The dry product is extracted at the boil with tetrachlorethane, the solvent is then removed by distillation, and the residue is extracted with alcohol. By distilling off the alcohol the purified dehydrogenation product is obtained as a residue.

The resulting α-[N-ethylbenzimidazyl-(2)]-β-[6-methylbenzimidazyl-(2)]-ethylene is a pale yellow powder which is easily soluble in alcohol. Very dilute alcoholic solutions thereof exhibit a strong violet-blue fluorescence.

Example 11

100 parts of soap are ground with 20 parts of sodium perborate, 40 parts of sodium metasilicate, and 0.04 part of α-[benzimidazyl-(2)]-β-[N-hydroxyethyl-benzimidazyl-(2)]-ethylene to form a powder.

Undyed cellulosic material which has been washed in the ordinary manner in a bath containing the above mixture shows a whiter appearance than such material which has been washed without this diimidazole.

What we claim is:

1. A detergent composition consisting essentially of a water-soluble, synthetic organic, anion-active detergent selected from the group consisting of water-soluble soaps and synthetic, organic, non-soap, anion-active, sulfonated detergents containing 0.005 to 1 per cent. by weight of an asymmetric substitution product of a diimidazole of the general formula

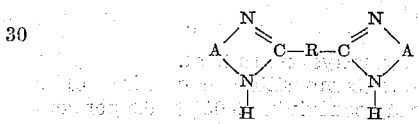

wherein A is an aromatic radical of the benzene series in which two vicinal carbon atoms are bound to nitrogen atoms of the imidazole rings and R is an ethylene radical.

2. A detergent composition consisting essentially of a water-soluble, synthetic organic, anion-active detergent selected from the group consisting of water-soluble soaps and synthetic organic, non-soap, anion-active, sulfonated detergents containing 0.005 to 1 per cent. by weight of diimidazole of the general formula

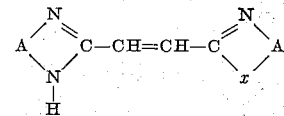

wherein A is a radical of the benzene series in which two vicinal carbon atoms are bound to nitrogen atoms of the imidazole rings and $x$ is the nitrogen atom of a tertiary amino group connected by its third valence to an aliphatic radical selected from the group consisting of lower alkyl and hydroxyalkyl radicals.

3. A detergent composition consisting of a water-soluble soap containing 0.005 to 0.5 per cent by weight of a diimidazole of the general formula

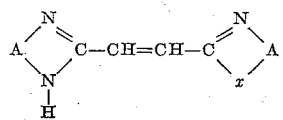

wherein A is a radical of the benzene series in which two vicinal carbon atoms are bound to nitrogen atoms of the imidazole rings and $x$ is the nitrogen atom of a tertiary amino group, connected by its third valence to an aliphatic radical selected from the group consisting of lower alkyl and hydroxyalkyl radicals.

4. A detergent composition consisting of a water-soluble soap containing 0.005 to 0.5 per cent by weight of a diimidazole of the general formula

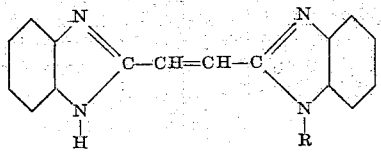

wherein R is a lower alkyl radical.

5. A detergent composition consisting of a water-soluble soap containing 0.005 to 0.5 per cent by weight of the diimidazole of the formula

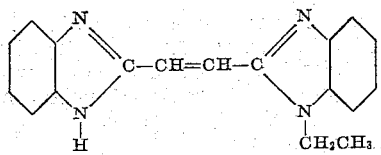

6. A detergent composition consisting of a water-soluble soap containing 0.005 to 0.5 per cent by weight of a diimidazole of the general formula

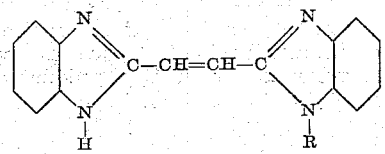

wherein R is a hydroxyalkyl radical.

7. A detergent composition consisting of a water-soluble soap containing 0.005 to 0.5 per cent by weight of the diimidazole of the formula

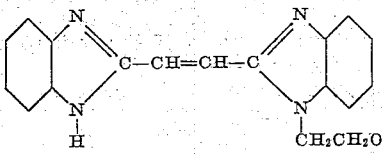

8. A detergent composition consisting of a water-soluble, synthetic organic, non-soap, anion-active, sulfonated detergent containing 0.005 to 0.5 per cent by weight of a diimidazole of the general formula

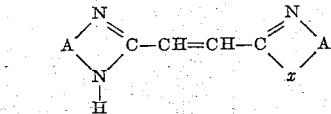

wherein A is a radical of the benzene series in which two vicinal carbon atoms are bound to nitrogen atoms of the imidazole rings and $x$ is the nitrogen atom of a tertiary amino group, connected with its third valence to an aliphatic radical selected from the group consisting of alkyl and hydroxyalkyl radicals.

9. A detergent composition consisting of a water-soluble, synthetic organic non-soap, anion-active, sulfuric acid ester detergent containing 0.005 to 0.5 per cent by weight of a diimidazole of the general formula

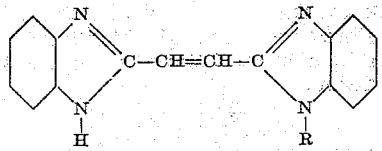

wherein R is a hydroxyalkyl radical.

10. A detergent composition consisting of a water-soluble salt of a sulfuric acid ester of a fatty alcohol containing at least 10 carbon atoms and 0.005 to 0.5 per cent by weight of the diimidazole of the formula

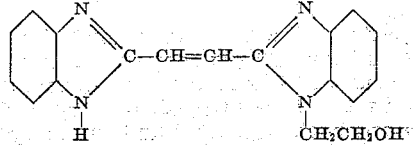

11. A detergent composition consisting of a water-soluble salt of a sulfuric acid ester of a mixture of fatty alcohols containing 10 to 16 carbon atoms and 0.005 to 0.5 per cent by weight of the diimidazole of the formula

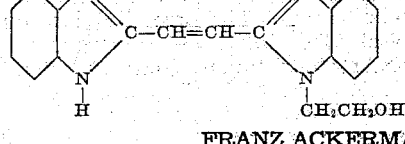

FRANZ ACKERMANN.
JULES MEYER.

REFERENCES CITED

The following references are of record in the file of this patent:

UNITED STATES PATENTS

| Number | Name | Date |
|---|---|---|
| 2,463,264 | Graenacher et al. | Mar. 1, 1949 |

FOREIGN PATENTS

| Number | Country | Date |
|---|---|---|
| 731,558 | Germany | Feb. 11, 1943 |
| 584,484 | Great Britain | Jan. 15, 1947 |